(12) United States Patent
Shibata et al.

(10) Patent No.: US 7,868,996 B2
(45) Date of Patent: Jan. 11, 2011

(54) LIQUID IMMERSION MICROSCOPE

(75) Inventors: Hiromasa Shibata, Yokohama (JP); Manabu Komatsu, Yokohama (JP); Toshio Uchikawa, Chigasaki (JP)

(73) Assignee: Nikon Corporation, Tokyo (JP)

( * ) Notice: Subject to any disclaimer, the term of this patent is extended or adjusted under 35 U.S.C. 154(b) by 411 days.

(21) Appl. No.: 12/083,835

(22) PCT Filed: Oct. 18, 2006

(86) PCT No.: PCT/JP2006/320761
§ 371 (c)(1),
(2), (4) Date: Apr. 18, 2008

(87) PCT Pub. No.: WO2007/046429
PCT Pub. Date: Apr. 26, 2007

(65) Prior Publication Data
US 2009/0251691 A1    Oct. 8, 2009

(30) Foreign Application Priority Data
Oct. 21, 2005 (JP) .............................. 2005-307606

(51) Int. Cl.
G03B 27/52 (2006.01)
(52) U.S. Cl. .......................................... 355/30; 355/53
(58) Field of Classification Search .................. 355/30, 355/53
See application file for complete search history.

(56) References Cited
U.S. PATENT DOCUMENTS

| 2005/0052642 A1 | 3/2005 | Shibata et al. |
| 2005/0179997 A1 | 8/2005 | Komatsu et al. |
| 2005/0225738 A1 | 10/2005 | Shirai |
| 2006/0077367 A1 | 4/2006 | Kobayashi et al. |
| 2006/0164616 A1 | 7/2006 | Okada |
| 2007/0222958 A1* | 9/2007 | Nishii .......................... 355/53 |
| 2007/0242242 A1* | 10/2007 | Nagasaka et al. ............. 355/53 |

FOREIGN PATENT DOCUMENTS

| EP | 1 571 697 A1 | 9/2005 |
| JP | A-2005-083800 | 3/2005 |
| JP | A-2005-234457 | 9/2005 |
| JP | A-2005-234458 | 9/2005 |
| WO | WO 2004/053959 A1 | 6/2004 |
| WO | WO 2004/105107 A1 | 12/2004 |
| WO | WO 2005/031823 A1 | 4/2005 |

OTHER PUBLICATIONS

European Search Report for European Application No. 06821944.3; mailed Sep. 27, 2010.

* cited by examiner

*Primary Examiner*—Alessandro Amari
(74) *Attorney, Agent, or Firm*—Oliff & Berridge, PLC

(57) ABSTRACT

To provide a liquid immersion microscope device enabling nondestructive liquid immersion observation of a substrate without deteriorating quality of the substrate. To attain this, a liquid immersion microscope device of the present invention includes a supporting unit supporting a substrate as an observation target, an objective lens of a liquid immersion type, a first supplying unit supplying ultrapure water as a liquid for observation to a gap between a tip of the objective lens and the substrate, a first draining unit draining the liquid for observation after observation of the substrate, a second supplying unit supplying a liquid for cleaning, which is different from the liquid for observation drained by the first draining unit, to an area, of the substrate, that has been in contact with the liquid for observation, and a second draining unit draining the liquid for cleaning after the substrate is cleaned.

8 Claims, 2 Drawing Sheets

LIQUID IMMERSION MICROSCOPE

CROSS REFERENCE TO RELATED APPLICATION

This application is a U.S. National Phase application claiming the benefit of prior filed International Application Number PCT/JP2006/320761, filed Oct. 18, 2006, in which the International Application claims a priority date of Oct. 21, 2005 based on prior filed Japanese Application Number 2005-307606, the entire contents of which are incorporated herein by reference.

TECHNICAL FIELD

The present invention relates to a liquid immersion microscope device for liquid immersion observation of a substrate.

BACKGROUND ART

In order to perform high-resolution observation of a defect, a foreign substance, and the like of a circuit pattern formed on a substrate (for example, a semiconductor wafer, a liquid crystal substrate, or the like), it has been proposed to use a liquid immersion type objective lens, fill a gap between a tip of the objective lens and the substrate with a liquid such as water, and increase a numerical aperture of the objective lens according to a refractive index (>1) of the liquid (see, for example, patent document 1). It has been further proposed to dry a substrate by an organic solvent, an air knife, or the like after the liquid immersion observation of the substrate and return the dried substrate to a cassette.

Patent Document 1: Japanese Unexamined Patent Application Publication No 2005-83800

DISCLOSURE

Problems to be Solved

In the abovementioned device, however, it is highly likely that contaminants such as an oxide film and a ring-shaped stain are adhering on a surface (area that has been in contact with the liquid) of the dried substrate, and these contaminants become defects to sometimes deteriorate the quality of the substrate. The substrate with the deteriorated quality is useless and thus has to be discarded. Therefore, with the abovementioned device, non-obstructive liquid immersion observation of the substrate (that is, nondestructive inspection) has not been possible. Similar problems can occur not only when a substrate is observed in state where it is locally immersed in the liquid but also when a substrate is observed in a state where its whole surface is immersed in the liquid.

A proposition of the present invention is to provide a liquid immersion microscope device which enables nondestructive liquid immersion observation of a substrate without deteriorating the quality of the substrate.

Means for Solving the Problems

A liquid immersion microscope device of the present invention includes a supporting unit supporting a substrate as an observation target, an objective lens of a liquid immersion type, a first supplying unit supplying ultrapure water as a liquid for observation to a gap between a tip of the objective lens and the substrate. a first draining unit draining the liquid for observation after observation of the substrate, a second supplying unit supplying a liquid for cleaning, which is different from the liquid for observation drained by the first draining unit, to an area, of the substrate, that has been in contact with the liquid for observation, and a second draining unit draining the liquid for cleaning after the substrate is cleaned.

Preferably, the second supplying unit takes in, from a circulation path of the ultrapure water, the ultrapure water that has been deaerated, or takes in, from the circulation path, the ultrapure water that has not been deaerated and deaerates the ultrapure water, in order to generate the liquid for cleaning, generates one kind of the liquid for cleaning from the obtained deaerated ultrapure water, and supplies the liquid for cleaning to the area of the substrate, and the one kind of the liquid for cleaning is one of a liquid containing ozone which is dissolved in the deaerated ultrapure water to 1 ppm concentration or higher, a liquid containing hydrogen which is dissolved in the deaerated ultrapure water to 0.6 ppm concentration or higher, and a liquid containing nitrogen which is dissolved in the deaerated ultrapure water.

Preferably, the second supplying unit takes in, from the circulation path, the ultrapure water that has been deaerated, or takes in, from the circulation path, the ultrapure water that has not been deaerated and deaerates the ultrapure water, in order to generate the liquid for cleaning, generates two kinds or more of the liquids for cleaning from the obtained deaerated ultrapure water, and sequentially supplies the liquids for cleaning to the area of the substrate, and the two kinds or more of the liquids for cleaning are any two or more of a liquid containing ozone which is dissolved in the deaerated ultrapure water to 1 ppm concentration or higher, a liquid containing hydrogen which is dissolved in the deaerated ultrapure water to 0.6 ppm concentration or higher, and a liquid containing nitrogen which is dissolved in the deaerated ultrapure water.

Preferably, the device further includes an oscillating unit which oscillates an ultrasonic wave toward the liquid containing the dissolved hydrogen when the second supplying unit supplies the liquid containing the dissolved hydrogen as the liquid for cleaning.

Effect

According to the liquid immersion microscope device of the present invention, nondestructive liquid immersion observation of a substrate is enabled without deteriorating the quality of the substrate.

DETAILED DESCRIPTION OF THE EMBODIMENTS

Hereinafter, an embodiment of the present invention will be described in detail using the drawings.

Figure 1:
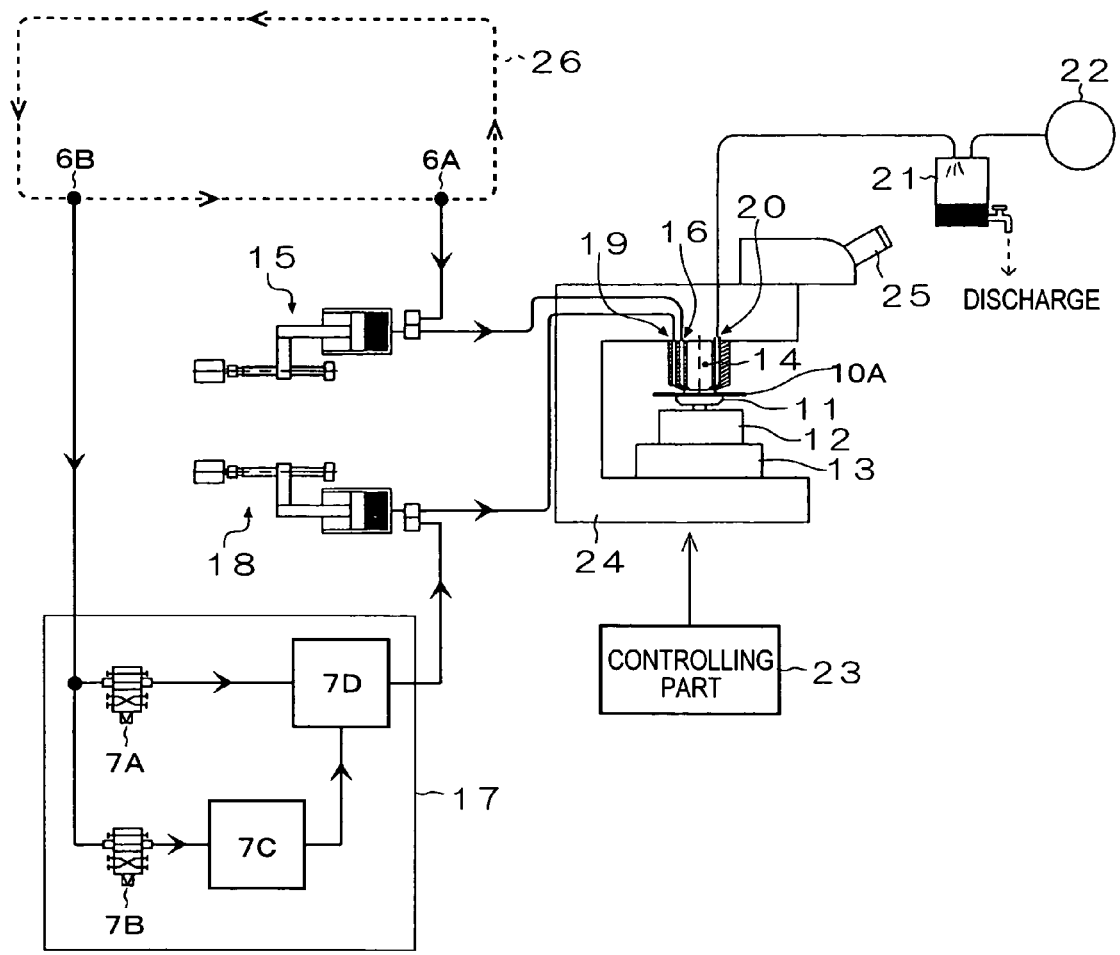
FIG. 1 is a general structural view of a liquid immersion microscope device 10.

As shown in FIG. 1, a liquid immersion microscope device 10 of this embodiment includes: a stage unit (11~13) supporting a substrate 10A as an observation target, an objective lens 14 of a liquid immersion type, a mechanism (15, 16) supplying a liquid for observation, a mechanism (17~19) supplying a liquid for cleaning, a mechanism (20~22) draining these liquids, and a controlling part 23 controlling these parts.

Further, in the liquid immersion microscope device 10, an illumination optical system, an observation optical system, a mechanism automatically transferring the substrate 10A, an auto-focus mechanism of a TTL type, and so on are provided, though not shown.

The substrate 10A is a semiconductor wafer, a liquid crystal substrate, or the like. The liquid immersion microscope device 10 is a device with which liquid immersion observation (visual external inspection) of a defect, a foreign substance, and so on of a circuit pattern formed on the substrate 10A is performed, in manufacturing processes of a semiconductor circuit element, a liquid crystal display element, and the like. The circuit pattern is, for example, a resist pattern.

The stage unit (11~13) includes a sample stage 11, a Z-stage 12, and an XY-stage 13. The substrate 10A is carried out of, for example, a developing apparatus to be placed on an upper surface of the sample stage 11, and is fixedly supported by, for example, vacuum suction. The sample stage 11 is movable in a vertical direction by the Z-stage 12 and is movable in a horizontal direction by the XY-stage 13.

The movement in the vertical direction by the Z-stage 12 takes place at the time of focusing of the substrate 10A. The controlling part 23 performs the focusing operation by using the auto-focus mechanism. The movement in the horizontal direction by the XY-stage 13 takes place when a predetermined observation point of the substrate 10A is positioned in a field of view of the objective lens 14. A base member of the XY-stage 13 is fixed to a lower portion of a main body (microscope body) of the liquid immersion microscope device 10.

The objective lens 14 of the liquid immersion type is fixed on an upper portion of the microscope body 24, and is designed such that aberration of the optical system is corrected when a gap between its tip and the substrate 10A is filled with an immersion medium (liquid for observation). An illumination light source is provided in the not-shown illumination optical system, and its observation wavelength is, for example, in the visible spectrum or the ultraviolet spectrum. If the wavelength is in the visible spectrum, the liquid immersion observation of the substrate 10A using an ocular lens 25 is possible. When the wavelength is in the ultraviolet spectrum, in order to perform the liquid immersion observation, it is necessary to provide a CCD camera or the like instead of the ocular lens 25 to capture an image and display the image on a monitor device.

Figure 2:
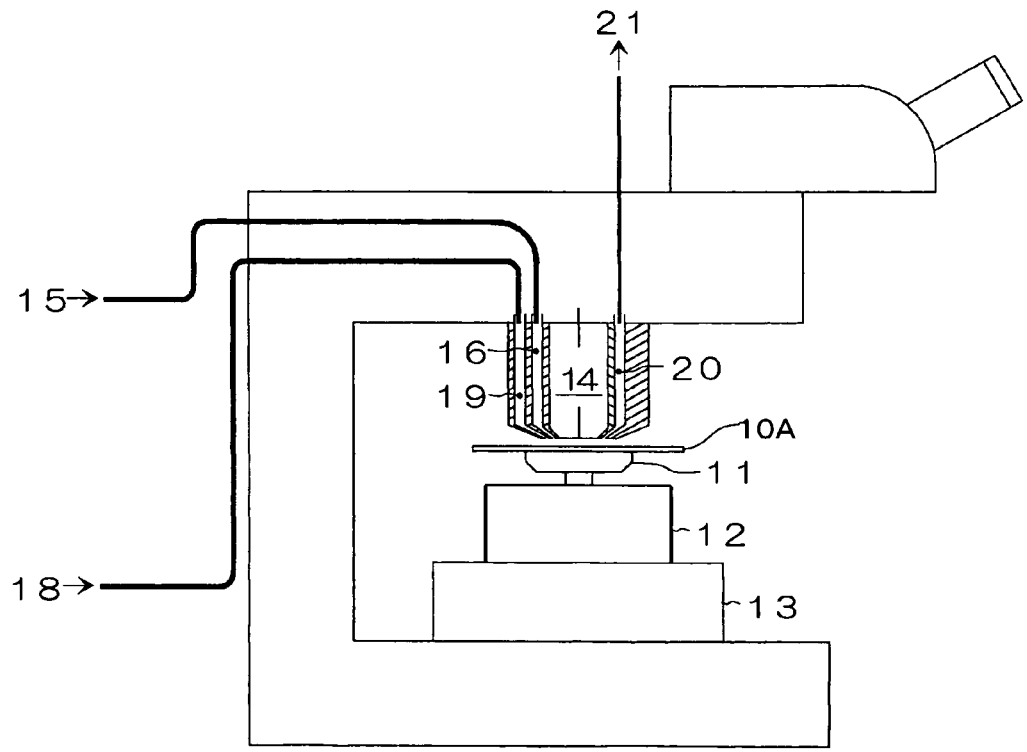
FIG. 2 is an enlarged view to explain the structure of the vicinity of an objective lens 14.

Around the objective lens 14, a discharge nozzle 16 of the mechanism (15, 16) supplying the liquid for observation, a discharge nozzle 19 of the mechanism (17~19) supplying the liquid for cleaning, and a suction nozzle 20 of the mechanism (20~22) draining these liquids are fixedly provided. Further, tips of these discharge nozzles 16, 19 and suction nozzle 20 are positioned near the tip of the objective lens 14 as shown in the enlarged view in FIG. 2.

A pressurized pump 15 (FIG. 1) is coupled to the discharge nozzle 16 so as to enable the discharge nozzle 16 to discharge a predetermined amount of the liquid for observation to the gap between the tip of the objective lens 14 and the substrate 10A, and this pressurized pump 15 is coupled to a bifurcated point 6A of a circulation path 26 of ultrapure water. The pressurized pump 15 and the discharge nozzle 16 form the mechanism (15, 16) supplying the liquid for observation.

Further, a pressurized pump 18 and a cleaning liquid generating device 17 are coupled to the discharge nozzle 19 in order to enable the discharge nozzle 19 to discharge a predetermined amount of the liquid for cleaning, and this cleaning liquid generating device 17 is coupled to a bifurcated point 6B of the circulation path 26 of the ultrapure water. The cleaning liquid generating device 17, the pressurized pump 18, and the discharge nozzle 19 form the mechanism (17~19) supplying the liquid for cleaning.

Here, the circulation path 26 of the ultrapure water will be described.

Figure 3:
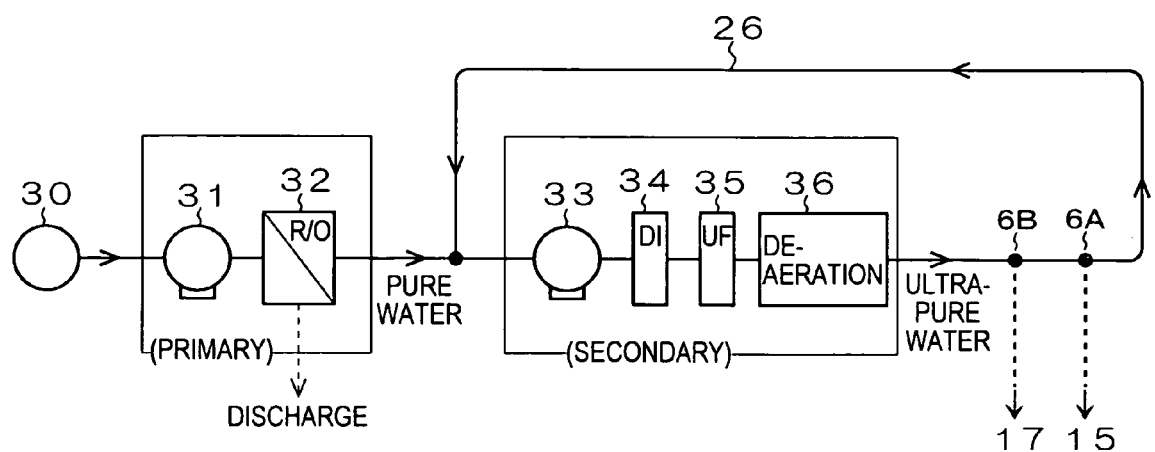
FIG. 3 is a view to explain an ultrapure water generating device (31~36) and a circulation path 26.

As shown in FIG. 3, pure water generated in a primary pure water system (31, 32) is taken into the circulation path 26. In the primary pure water system (31, 32), a high-pressure pump 31 and a reverse osmosis membrane (R/O) device 32 are at least provided. An input side of the high-pressure pump 31 is coupled to a water source 30 of a factory. Water (city water) of the water source 30 of the factory is pumped up by the high-pressure pump 31, passes through the reverse osmosis membrane device 32, where impurities therein are removed, and is turned into pure water.

In the circulation path 26, the pure water generated by the primary pure water system (31, 32) is taken in and passes through a secondary ultrapure water system (33~36), where its purity is further increased, so that ultrapure water whose purity level is high enough to be used for the liquid immersion observation of the substrate 10A is generated. In the secondary ultrapure water system (33~36), a circulating pump 33, an ion-exchange resin (DI) 34, an ultrafiltration filter (UF) 35, and a deaeration device 36 are at least provided. The deaeration device 36 is a device for removing oxygen dissolved in the ultrapure water and is, for example, a vacuum deaeration device.

Further, the ultrapure water (deaerated ultrapure water) generated in the secondary ultrapure water system (33~36) is fed back to an upstream side of the circulating pump 33 of the secondary ultrapure water system (33~36) via the bifurcated points 6A, 6B on a pipe. Then, the ultrapure water is forcedly circulated by the circulating pump 33. The forced circulation of the ultrapure water in the circulation path 26 makes it possible to maintain the purity of the ultrapure water, leading to the prevention of the propagation of bacteria.

If the whole ultrapure water generating device made up of the primary pure water system (31, 32) and the secondary ultrapure water system (33~36) is provided in the factory in advance, pipes of the mechanism (15, 16) supplying the liquid for observation and the mechanism (17~19) supplying the liquid for cleaning are coupled to the bifurcated points 6A, 6B of the circulation path 26 respectively, whereby the liquid immersion observation of the substrate 10A using the liquid immersion microscope device 10 of this embodiment is enabled.

If only the primary pure water system (31, 32) is installed in the factory in advance, the secondary ultrapure water system (33~36) and the circulation path 26 are provided in the liquid immersion microscope device 10 of this embodiment, and the pipes of the abovementioned mechanism (15, 16) and mechanism (17~19) are coupled to the bifurcated points 6A, 6B of the circulation path 26 respectively in this device. Then, an output pipe of the primary pure water system (31, 32) of the factory is coupled to the circulation path 26 in the device, whereby the liquid immersion observation of the substrate 10A using the liquid immersion microscope device 10 of this embodiment is enabled.

As described above, the ultrapure water in the circulation path 26 is water whose purity level is kept high enough to be used for the liquid immersion observation of the substrate 10A, in which the propagation of bacteria is prevented, and which has been deaerated. The forced circulation of the ultrapure water is continued along the circulation path 26 until the controlling part 23 (FIG. 1) of the liquid immersion microscope device 10 outputs a discharge command. The bifurcated points 6A, 6B of the circulation path 26 are called use points as well.

In the liquid immersion microscope device 10 as structured above, the controlling part 23 outputs the command for discharging the liquid for observation prior to the liquid immersion observation of the substrate 10A, so that a predetermined amount of the ultrapure water is taken in from the bifurcated point 6A of the circulation path 26 to be sent to the pressurized pump 15. Further, a predetermined amount of the ultrapure water is sent to the discharge nozzle 16 from the pressurized pump 15, is supplied, as the liquid for observation, to a gap between the tip of the objective lens 14 and an observation point of the substrate 10A to form a "liquid droplet" due to surface tension. Then, the liquid immersion observation of the substrate 10A is performed in a local immersion state, that is, in a state where the liquid for observation is locally supplied.

Thereafter, when the liquid immersion observation at a given observation point is finished, the controlling part 33 of the liquid immersion microscope device 10 outputs a command for draining the liquid for observation. In order to drain the liquid for observation from the substrate 10A by using the abovementioned suction nozzle 20, a vacuum pump 22 is coupled to the suction nozzle 20 via a drainage tank 21. The suction nozzle 20, the drainage tank 21, and the vacuum pump 22 form the mechanism (20~22) draining the liquid for observation. Note that this mechanism (20~22) is further used when the liquid for cleaning is drained. A vacuum device (not shown) in the factory may be coupled instead of the vacuum pump 22.

When the command for draining the liquid for observation is output from the controlling part 23, the vacuum pump 22 sucks the liquid between the tip of the objective lens 14 and the substrate 10A and surrounding air altogether via the drainage tank 21 and the suction nozzle 20. That is, the liquid is removed from the substrate 10A. The sucked liquid is led to the drainage tank 21, separated from the air there, and collected in the drainage tank 21. Then, only the air is led to the vacuum pump 22.

In this manner, in the liquid immersion microscope device 10 of this embodiment, the liquid for observation is automatically supplied/drained based on the commands from the controlling part 23 at the time of the liquid immersion observation of the substrate 10A, which almost completely frees an operator from burden, enabling the liquid immersion observation of the substrate 10A with a high throughput.

Further, in the liquid immersion microscope device 10 of this embodiment, the liquid for observation is locally supplied/drained via the discharge nozzle 16 and the suction nozzle 20, and only the observation point of the substrate 10A and its vicinity are immersed in the liquid (that is, a locally immersed state). This can limit a contact portion with the liquid for observation on a surface of the substrate 10 to a minimum necessary range for the liquid immersion observation.

Further, in the liquid immersion microscope device 10 of this embodiment, a predetermined amount of the ultrapure water is taken in from the circulation path 26 of the ultrapure water only when necessary (that is, only when the liquid immersion observation is started). This makes it possible to always supply high-quality ultrapure water (that is, ultrapure water whose purity level is kept high enough to be used for the liquid immersion observation of the substrate 10A, in which the propagation of bacteria is prevented, and which has been deaerated) as the liquid for observation.

Yet, even in the high-quality ultrapure water, there remain more or less impurities (for example, metal ions, fine particles, bacteria, oxygen, and so on). Further, during the liquid immersion observation of the substrate 10A, various substances (for example, oxygen, organic matters, silica, and so on) elude from the surroundings into the ultrapure water, even if the ultrapure water has a high quality immediately after it is supplied, and thus its water quality gradually gets lower. As a result, when the substrate 10A is dried after the liquid immersion observation, contaminants such as an oxide film, a ring-shaped stain, and so on adhere to the surface (the area that has been in contact with the liquid for observation) of the substrate 10A after the substrate 10A is dried. Then, these contaminants become defects to sometimes greatly deteriorate the quality of the substrate 10A.

For example, dissolved oxygen has a strong corrosive effect on a silicon wafer and metal, and is chemically combined with dissolved silica to form an oxide film (for example, an insulating film of $SiO_2$ or the like) on a surface of the wafer, and the oxide film becomes a defect. An organic matter (TOC) easily becomes a cause of a ring-shaped stain after the drying. It is known that TOC concentration and defect density on a wafer are correlated to each other. Silica is likely to be a cause of an oxide film on the wafer surface. Even a minute amount of metal ions easily causes a failure once adhering to the wafer surface. Fine particles enter between microscopic wiring patterns after the wafer is dried, to become a defect. Viable microorganisms such as bacteria give the same adverse effect as is given by the fine particles once they propagate to form a colony.

Thus, in the liquid immersion observation of the substrate 10A, since the substrate 10A and the liquid for observation are brought into contact with each other during the liquid immersion observation, the abovementioned contaminants ascribable to the liquid for observation adhere as defects to the area that has been in contact with the liquid for observation when the substrate 10A is dried after the observation, which sometimes greatly deteriorates the quality of the substrate 10A. The substrate 10A with the deteriorated quality is useless and has to be discarded.

Therefore, according to the liquid immersion microscope device 10 of this embodiment, for the purpose of the nondestructive liquid immersion observation of the substrate 10A without any quality deterioration of the substrate 10A, the surface (area that has been in contact with the liquid) of the substrate 10A is cleaned after the liquid for observation is drained. The cleaning of the substrate 10A may come after the drying of the substrate 10A, but cleaning the substrate 10A prior to the drying is more effective. For the cleaning of the substrate 10A, the mechanism (17~19) supplying the liquid for cleaning and the mechanism (20~22) draining the liquid are used.

When the drainage of the liquid for observation is finished, the controlling part 23 of the liquid immersion microscope device 10 outputs a command for discharging the liquid for cleaning, so that a predetermined amount of the ultrapure water is taken in from the bifurcated point 6B of the circulation path 26 and the ultrapure water is sent to the cleaning liquid generating device 17. The cleaning liquid generating device 17 is made up of electromagnetic valves 7A, 7B, a gas dissolving part 7C, and a mixing part 7D, and generates the liquid for cleaning (cleaning liquid) by using the ultrapure water (deaerated ultrapure water) taken in from the bifurcated point 6B.

For example, if the liquid containing ozone which is dissolved in the deaerated ultrapure water (hereinafter, "ozone water") is generated as the cleaning liquid, gas from an ozone source (ozone generating device) is used. The dissolution of the ozone is continued until its concentration reaches 1 ppm or higher. With the concentration in such a range, a sufficient cleaning effect to the substrate 10A is exhibited. The ozone need not be dissolved to saturation, but its concentration is preferably made high in order to enhance the cleaning effect. The cleaning effect by the ozone water is an effect of removing an oxide film which is formed due to dissolved oxygen, diluted silica, and the like.

Further, if the liquid containing hydrogen which is dissolved in the deaerated ultrapure water (hereinafter, "hydrogen water") is generated as the cleaning liquid, gas from a hydrogen source (for example, a cylinder) is used. Hydrogen is dissolved until its concentration reaches 0.6 ppm or higher. With the concentration in such a range, a sufficient cleaning effect to the substrate 10A is exhibited. Hydrogen need not be dissolved to saturation, but its concentration is preferably high in order to enhance the cleaning effect. The cleaning effect by the hydrogen water is an effect of removing particles ascribable to an organic matter, fine particles, bacteria, and the like.

Further, if the liquid containing nitrogen which is dissolved in the deaerated ultrapure water (hereinafter, "nitrogen water") is generated as the cleaning liquid, gas from a nitrogen source (for example, a cylinder) is used. By dissolving nitrogen, it is possible to surely eliminate oxygen and to exhibit a sufficient cleaning effect to the substrate 10A. The cleaning effect by the nitrogen water is an effect of preventing the formation of an oxide film. Nitrogen need not be dissolved to saturation, but its concentration is preferably high in order to enhance the cleaning effect, and more preferably, nitrogen is dissolved to saturation. When it is dissolved to saturation, the oxidizing action to the substrate 10A is eliminated.

In this embodiment, in the cleaning liquid generating device 17, for example, any one kind out of the abovementioned ozone water, hydrogen water, and nitrogen water is generated as the cleaning liquid. The one kind of the cleaning liquid may be selected according to which effect is the most necessary (for example, the effect of removing an oxide film) as the effect of cleaning the substrate 10A. By using one kind of the cleaning liquid, it is possible to clean the substrate 10A in a short time.

The cleaning liquid generated in the cleaning liquid generating device 17 is sent to the pressurized pump 18, sent from the pressurized pump 18 to the discharge nozzle 19, and supplied to the surface (area that has been in contact with the liquid for observation) of the substrate 10A from a tip of the discharge nozzle 19. By thus supplying cleaning liquid (for example, the ozone water or the like), it is possible to clean the surface (area that has been in contact with the liquid) of the substrate 10A.

Then, after the substrate 10A is cleaned, the controlling part 23 of the liquid immersion microscope device 10 outputs a command for draining the cleaning liquid. To drain the cleaning liquid, the same mechanism (20~22) as is used to drain the liquid for observation is used, and the vacuum pump 22 sucks the cleaning liquid and surrounding air altogether via the drainage tank 21 and the suction nozzle 20. That is, the cleaning liquid is removed from the substrate 10A. The sucked cleaning liquid is led to the drainage tank 21, separated from the air there, and collected in the drainage tank 21. Then, only the air is led to the vacuum pump 22.

As described above, in the liquid immersion microscope device 10 of this embodiment, at the time of the liquid immersion observation of the substrate 10A, the cleaning liquid such as, for example, the ozone water is supplied to the surface (area that has been in contact with the liquid for observation) of the substrate 10A to clean this area after the liquid for observation is drained, which enables nondestructive liquid immersion observation of the substrate 10A without deteriorating the quality of the substrate 10A. The supply/drainage of the cleaning liquid may take place once, but repeating the supply/drainage several times as required is preferable. The larger the number of the repetition times, the higher cleaning effect can be obtained.

Further, with the liquid immersion microscope device 10 of this embodiment, the nondestructive liquid immersion observation of the substrate 10A (that is, the nondestructive inspection) is enabled without deteriorating the quality of the substrate 10A, and therefore, the substrate 10A after undergoing the inspection can be sent to the next line as a good product without being discarded, resulting in improved yields.

Further, in the liquid immersion microscope device 10 of this embodiment, to clean the substrate 10A, the ultrapure water is taken in from the circulation path 26 which is commonly used for the liquid for observation, and therefore, if the circulation path 26 is installed in the factory in advance, an increase in size of the factory is prevented. Further, if the circulation path 26 is provided in the liquid immersion microscope device 10, the use of the same circulation path 26 for the observation and cleaning can prevent an increase in size of the liquid immersion microscope device 10.

Further, in the liquid immersion microscope device 10 of this embodiment, to clean the substrate 10A, the cleaning liquid such as, for example, the ozone water is automatically supplied/drained based on the commands from the controlling part 23, which almost completely frees an operator from burden, realizing the cleaning of the substrate 10A with a high throughput. Therefore, the whole liquid immersion observation including the cleaning of the substrate 10A can be performed with a high throughput.

Further, in the liquid immersion microscope device 10 of this embodiment, the cleaning liquid is locally supplied/drained via the discharge nozzle 19 and the suction nozzle 20, which makes it possible to efficiently clean only the observation point and its vicinity of the substrate 10A (only the area that has been in contact with the liquid for observation).

Further, in the liquid immersion microscope device 10 of this embodiment, a predetermined amount of the ultrapure water is taken in from the circulation path 26 of the ultrapure water only when necessary (that is, only when the cleaning of the substrate 10A is started). Therefore, the cleaning liquid can be always generated by using the high-quality ultrapure water (that is, the ultrapure water whose purity level is kept high enough to be used for the liquid immersion observation of the substrate 10A, in which the propagation of bacteria is prevented, and which has been deaerated), enabling the supply of the high-quality cleaning liquid.

Further, in the liquid immersion microscope device 10 of this embodiment, when the cleaning liquid is supplied to the surface (area that has been in contact with the liquid for observation) of the substrate 10A, the observation point of the substrate 10A is kept positioned within a field of view of the objective lens 14 (that is, kept in the same state as that during the observation), which makes it possible to quickly clean the substrate 10A before the substrate 10A is dried after the liquid for observation is drained. Moreover, the tip of the object lens 14 can be cleaned simultaneously with the cleaning of the substrate 10A.

The timing at which the ultrapure water is taken in from the circulation path 26 for the generation of the cleaning liquid may be after the liquid for observation is drained, but it is preferable to take in the ultrapure water from the circulation path 26 to generate the cleaning liquid, before the liquid for observation is drained so that the cleaning liquid can be supplied immediately after the liquid for observation is drained.

Further, in the liquid immersion microscope device 10 of this embodiment, the cleaning liquid is generated from the deaerated ultrapure water which is taken in from the circulation path 26, so that predetermined gas such as ozone, hydrogen, or nitrogen can be dissolved in the ultrapure water.

Modified Example

The above embodiment describes the example where one kind out of the ozone water, the hydrogen water, and the nitrogen water is generated as the cleaning liquid, but the present invention is not limited to this. Two kinds or more out of the ozone water, the hydrogen water, and the nitrogen water may be generated as the cleaning liquid. In this case, it is preferable to sequentially supply two kinds or more of the cleaning liquids to the surface (area that has been in contact with the liquid for observation) of the substrate 10A. That is, it is preferable to prevent the cleaning liquids with different cleaning effects from mixing with each other in the procedure of repeating the supply/drainage of the second cleaning liquid after the supply/drainage of the first cleaning liquid. The sequential supply of two kinds or more of the cleaning liquids makes it possible to sequentially remove different kinds of contaminants (an oxide film, a ring-shaped stain, and so on), which can more enhance the quality of the substrate 10A after the inspection.

Further, the above embodiment describes the example where the substrate 10A is cleaned by the supply/drainage of the cleaning liquid, irrespective of the kind of the cleaning liquid, but the present invention is not limited to this. When the hydrogen water is used as the cleaning liquid, it is preferable not only to simply supply/drain the hydrogen water but also to vibrate the hydrogen water on the substrate 10A by an ultrasonic wave. A possible method for this is to mount a unit oscillating the ultrasonic wave toward the hydrogen water (for example, an ultrasonic oscillator) on, for example, the sample stage 11 or the like and control this unit to oscillate the ultrasonic wave when the hydrogen water is supplied. Vibrating the hydrogen water can enhance the effect of removing particles. A mounting place of the ultrasonic oscillator or the like may be any of the discharge nozzles 16, 19, the suction nozzle 20, the objective lens 14 instead of the sample stage 11.

Further, in the above-described embodiment, the deaeration device 36 is provided in the secondary ultrapure water system (33~36) of the circulation path 26 of the ultrapure water and the cleaning liquid is generated from the deaerated ultrapure water which is taken in from the circulation path 26, but the present invention is not limited to this. The abovementioned deaeration device 36 may be omitted. In this case, the cleaning liquid is generated from the undeaerated ultrapure water which is taken in from the circulation path 26.

Further, the abovementioned deaeration device 36 may be omitted, and instead, a similar deaeration device may be provided on a pipe between the bifurcated point 6B of the circulation path 26 and the cleaning liquid generating device 17. In this case, the ultrapure water that has not been deaerated is taken in from the circulation path 26 to be deaerated, and the cleaning liquid is generated by using the obtained deaerated ultrapure water.

Further, if the abovementioned deaeration device 36 is omitted, the similar deaeration device may be provided or need not be provided on a pipe between the bifurcated point 6A of the circulation path 26 and the pressurized pump 15. If the deaeration device is not provided, the undeaerated ultra-pure water is supplied as the liquid for observation, and consequently, an oxide film is easily formed on the surface of the substrate 10A due to this liquid, but this is not a significant problem because the substrate 10A is cleaned with the cleaning liquid such as, for example, the ozone water after the liquid for observation is drained.

Further, in the above-described embodiment, when the liquids for observation and cleaning are drained, the liquids are sucked by the suction nozzle 20, the vacuum pump 22, and the like, but the present invention is not limited to this. A unit drying the liquids (for example, a blower) may be provided in addition to such suction units to quickly dry the liquids during or after the suction.

A unit supplying clean nitrogen to the surroundings of the objective lens 14 may further be provided. In this case, the liquid supplied to the gap between the tip of the objective lens 14 and the substrate 10A can be kept in a nitrogen atmosphere, which can avoid the elusion of oxygen into the liquid. Therefore, the formation of an oxide film can be effectively suppressed.

Further, in the above-described embodiment, the discharge nozzles 16, 19 and the pressurized pumps 15, 18 are provided separately for supplying the liquids for observation and cleaning, but a common discharge nozzle and a common pressurized pump may be used. The discharge nozzle 20, the drainage tank 21, and so on which are provided in common for draining the liquids for observation and cleaning may be dividedly provided.

Further, the above embodiment describes the example where the substrate 10A is observed in a locally immersed state, but the present invention is not limited to this. When the substrate 10A is observed in a state where its whole surface is immersed in the liquid, the same effects can be obtained if the present invention is applied. This requires a stage having a structure allowing the whole surface of the substrate 10A and the tip of the objective lens 14 to be immersed in the liquid. After the observation, the cleaning liquid is further supplied to the whole surface (that is, the area that has been in contact with the liquid for observation) of the substrate 10A.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling with the scope thereof.

The invention claimed is:

1. A liquid immersion microscope device comprising:
a supporting unit supporting a substrate as an observation target;
an objective lens of a liquid immersion type;
a first supplying unit supplying ultrapure water as a liquid for observation to a gap between a tip of said objective lens and said substrate;
a first draining unit draining said liquid for observation after observation of said substrate;
a second supplying unit supplying a liquid for cleaning, which is different from said liquid for observation drained by said first draining unit, to an area, of said substrate, that has been in contact with said liquid for observation; and
a second draining unit draining said liquid for cleaning after said substrate is cleaned.

2. The liquid immersion microscope device according to claim 1, wherein said liquid for cleaning is obtained from the ultrapure water.

3. The liquid immersion microscope device according to claim 1, wherein:
   said second supplying unit takes in an ultrapure water that has been deaerated, or deaerates an ultrapure water and generates said liquid for cleaning from the obtained deaerated ultrapure water.

4. The liquid immersion microscope device according to claim 3, wherein said liquid for cleaning is obtained by dissolving a gas in the ultrapure water.

5. The liquid immersion microscope device according to claim 4, wherein:
   said second supplying unit generates one kind of liquid for cleaning, as said liquid for cleaning, and supplies to said area of said substrate; and
   said one kind of the liquid for cleaning is one of a liquid containing ozone which is dissolved in the deaerated ultrapure water to 1 ppm concentration or higher, a liquid containing hydrogen which is dissolved in the deaerated ultrapure water to 0.6 ppm concentration or higher, and a liquid containing nitrogen which is dissolved in the deaerated ultrapure water.

6. The liquid immersion microscope device according to claim 4, wherein:
   said second supplying unit generates two kinds or more of said liquids for cleaning from the obtained deaerated ultrapure water, and sequentially supplies said liquids for cleaning to said area of said substrate; and
   said two kinds or more of the liquids for cleaning are any two or more of a liquid containing ozone which is dissolved in the deaerated ultrapure water to 1 ppm concentration or higher, a liquid containing hydrogen which is dissolved in the deaerated ultrapure water to 0.6 ppm concentration or higher, and a liquid containing nitrogen which is dissolved in the deaerated ultrapure water.

7. The liquid immersion microscope device according to claim 5, further comprising:
   an oscillating unit which oscillates an ultrasonic wave toward the liquid containing the dissolved hydrogen when said second supplying unit supplies said liquid containing the dissolved hydrogen as said liquid for cleaning.

8. The liquid immersion microscope device according to claim 6, further comprising:
   an oscillating unit which oscillates an ultrasonic wave toward the liquid containing the dissolved hydrogen when said second supplying unit supplies said liquid containing the dissolved hydrogen as said liquid for cleaning.

* * * * *